United States Patent
Sakamoto et al.

(10) Patent No.: US 6,394,561 B1
(45) Date of Patent: May 28, 2002

(54) BRAKE SYSTEM FOR VEHICLES WITH ROUTINE JUDGMENT OF NORMAL OPERATION OF PRESSURE SENSORS

(75) Inventors: Junichi Sakamoto, Gotenba; Akihiro Otomo, Toyota, both of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/365,222

(22) Filed: Jul. 30, 1999

(30) Foreign Application Priority Data

Aug. 19, 1998 (JP) .............................. 10-232831

(51) Int. Cl.$^7$ ................................. B60T 8/88
(52) U.S. Cl. .............................. 303/122.05; 303/116.1; 303/119.1; 303/122.09
(58) Field of Search ................................. 303/160, 166, 303/174, 122, 122.03, 122.04, 122.05, 122.06, 122.11, 122.12, 122.13, 122.14, 167, 113.2, 122.08

(56) References Cited

U.S. PATENT DOCUMENTS

| | | | |
|---|---|---|---|
| 3,936,095 A | | 2/1976 | Every |
| 5,044,702 A | * | 9/1991 | Beck et al. ............... 303/113.2 |
| 5,138,556 A | * | 8/1992 | Yoshino ............ 303/122.06 X |
| 5,150,298 A | * | 9/1992 | Fujioka et al. ........... 303/166 X |
| 5,401,083 A | * | 3/1995 | Altmann et al. ......... 303/113.2 |
| 5,647,647 A | * | 7/1997 | Kato et al. .............. 303/166 X |
| 5,769,509 A | | 6/1998 | Feigel et al. |
| 5,839,083 A | | 11/1998 | Sugiyama |
| 5,899,952 A | | 5/1999 | Fukada |
| 5,951,120 A | * | 9/1999 | Shimura et al. ....... 303/122.05 |
| 6,007,164 A | * | 12/1999 | Sakai et al. ............ 303/122.12 |
| 6,045,199 A | * | 4/2000 | Toyoda ................... 303/168 X |
| 6,123,397 A | | 9/2000 | Ohtomo et al. |

FOREIGN PATENT DOCUMENTS

| | | |
|---|---|---|
| DE | 38 29 949 A1 | 3/1990 |
| DE | 41 02 497 C1 | 5/1992 |
| GB | 2 315 834 A | 2/1998 |
| GB | 2 328 258 A | 2/1999 |
| JP | A-8-26099 | 1/1996 |
| JP | 10-100884 | 4/1998 |

\* cited by examiner

*Primary Examiner*—Paul N. Dickson
*Assistant Examiner*—Melanie Torres
(74) *Attorney, Agent, or Firm*—Oliff & Berridge, PLC

(57) ABSTRACT

In a brake system of a vehicle in which a pair of wheel cylinders are supplied with a fluid pressure by a fluid circuit having a pair of inlet control valves for selectively connecting the pair of wheel cylinders respectively to an outlet port of a motor-driven pump and a pair of outlet control valves for selectively connecting the pair of wheel cylinders respectively to a fluid reservoir, a brake control device controls the motor driving of the pump and opening/closing of the inlet and outlet control valves, such that a controlled fluid pressure is supplied to the pair of wheel cylinders at least temporarily with the pair of inlet control valves substantially fully opened, while the pair of outlet control valves substantially closed, wherein it is judged if there is a difference between output signals of a pair of wheel cylinder pressure sensors beyond a predetermined threshold value, thereby judging the pair of wheel cylinder pressure sensors to be both operating normally when the difference is not larger than the threshold value.

12 Claims, 5 Drawing Sheets

FIG. 1A
FIG. 1B
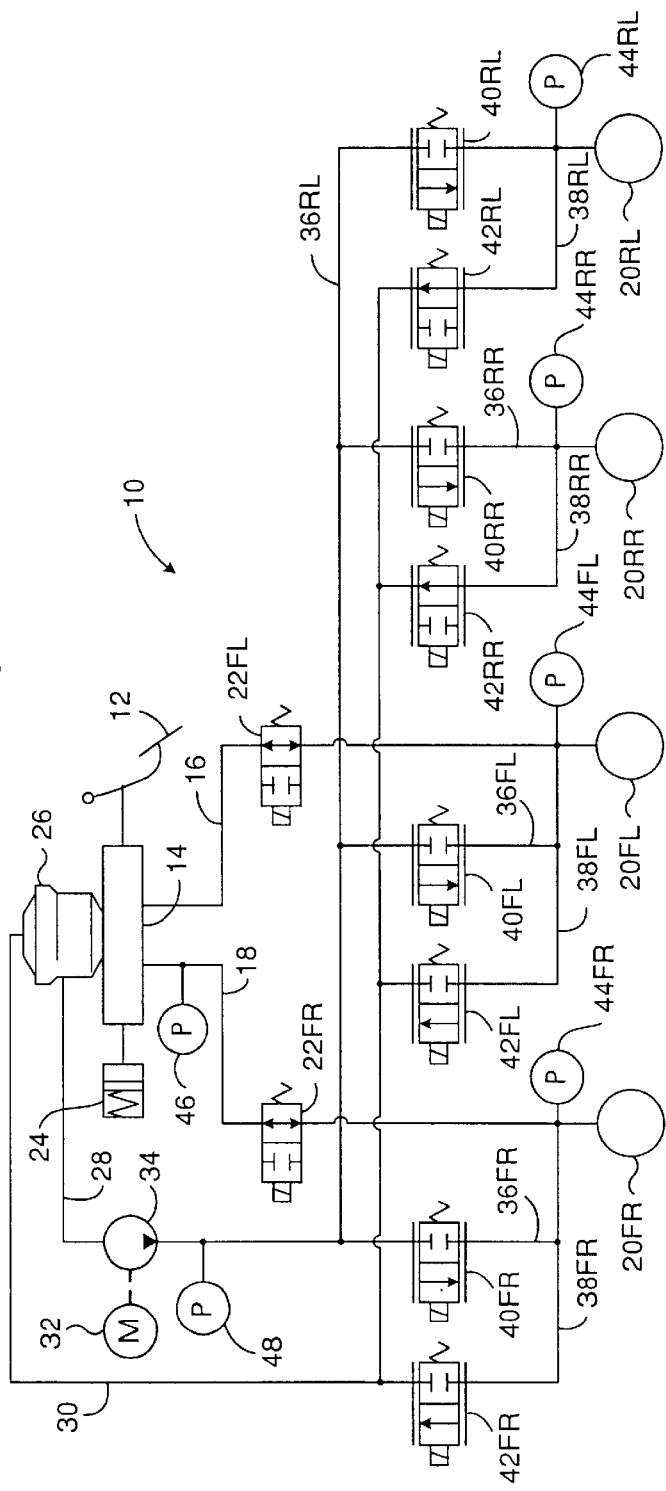
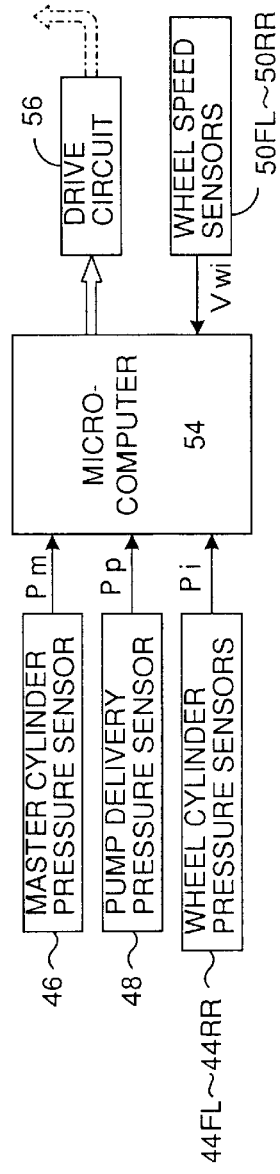

BRAKE SYSTEM FOR VEHICLES WITH ROUTINE JUDGMENT OF NORMAL OPERATION OF PRESSURE SENSORS

BACKGROUND OF THE INVENTION

1. Field of the Invention

The present invention relates to a brake system of vehicles such as automobiles, and more particularly, to such a brake system in which it is judged as a part of control routine if the pressure sensors incorporated therein are operating normally or not.

2. Description of the Prior Art

In the modern electrically controlled brake systems of vehicles such as automobiles, having a basic construction that a wheel cylinder for applying a braking force to a wheel is supplied with a brake fluid compressed by a motor-powered pump through a pressure control circuit which includes an inlet control valve of a solenoid changeover type for selectively connecting or isolating the wheel cylinder to or from the pump and an outlet control valve of a solenoid changeover type for selectively connecting or isolating the wheel cylinder to or from a drain passage leading to a reservoir for the pump, so that the pressure supplied to the wheel cylinder is controlled by an on/off duty ratio of the inlet and outlet control valves, the brake control is basically dependent upon the detection of the brake fluid pressure actually supplied to the wheel cylinder, as the control is a feedback control, and therefore, in order to ensure a sound operation of such a brake system it is essential that the normal operation of pressure sensors incorporated in the pressure control circuit is effectively judged.

In Japanese Patent Laid-open Publication 8-26099, there is described an electric brake system of a four-wheeled vehicle in which the four of a pair of front wheels and a pair of rear wheels are braked by individual wheel cylinders powered by separate fluid pressure generation means operated under a control of a central electronic control unit with a feedback of the pressures of the respective wheel cylinders detected by corresponding pressure sensors, wherein the front pair of wheel cylinders and the rear pair of wheel cylinders are respectively connected by a connection pipe incorporating a changeover valve, so that a failure of one of the front pair or rear pair of pressure sensors is detectable by a comparison of outputs of the pair of sensors under an opening of the changeover valve, in addition to a diagnosis of comparing the output of each sensor with the pressure instructed thereto from the central control unit.

The above-mentioned prior art needs an additional arrangement of the connection pipes and the changeover valves.

SUMMARY OF THE INVENTION

In view of the above, it is a primary object of the present invention to provide a brake system for vehicles such as automobiles, also in the modern electrical type, in which a normal operation of pressure sensors installed therein is judged without any additional arrangement of a pipe and/or a valve therefor.

Particularly, it is a further object of the present invention to provide such a brake system which can judge a normal operation of a pressure sensor for the pressure of a brake fluid at the delivery of a pump forming the pressure source of the brake system, together with a normal operation judgment of a pair of pressure sensors for a pair of wheel cylinders of a front pair or a rear pail of wheels.

According to the present invention, the above-mentioned primary object is accomplished by a brake system of a vehicle having a pair of front wheels and a pair of rear wheels, comprising a brake pedal, a fluid reservoir, a motor-driven pump for pumping a fluid from the reservoir to an outlet port thereof, at least one pair of wheel cylinders for braking one of the front pair and the rear pair of wheels according to a supply of a fluid pressure thereto, a fluid circuit having a pair of inlet control valves for selectively connecting the pair of wheel cylinders respectively to the outlet port of the pump and a pair of outlet control valves for selectively connecting the pair of wheel cylinders respectively to the reservoir, brake control means for controlling a motor driving of the pump and opening/closing of the inlet and outlet control valves so as to supply a controlled fluid pressure to the pair of wheel cylinders, and pressure sensors including a pair of wheel cylinder pressure sensors for measuring fluid pressures of the pair of wheel cylinders, the brake control means comprising:

means for at least temporarily substantially fully opening the pair of inlet control valves, while substantially closing the pair of outlet control valves;

means for comparing output signals of the pair of wheel cylinder pressure sensors to judge if there is a first difference therebetween beyond a first predetermined threshold value; and means for judging the pair of wheel cylinder pressure sensors to be both operating normally when the first difference is not larger than the first threshold value.

In such a brake system of a vehicle having a pair of front wheels and a pair of rear wheels, wherein the brake system comprises a brake pedal, a fluid reservoir, a motor-driven pump for pumping a fluid from the reservoir to an outlet port thereof, at least one pair of wheel cylinders for braking one of the front pair and the rear pair of wheels according to a supply of a fluid pressure thereto, a fluid circuit having a pair of inlet control valves for selectively connecting the pair of wheel cylinders respectively to the outlet port of the pump and a pair of outlet control valves for selectively connecting the pair of wheel cylinders respectively to the reservoir, and brake control means for controlling a motor driving of the pump and opening/closing of the inlet and outlet control valves so as to supply a controlled fluid pressure to the pair of wheel cylinders, it is possible to at least temporarily operate the brake system so as to apply a braking to the vehicle according to a depression of the brake pedal by a driver by supplying such a fluid pressure to the pair of wheel cylinders that is controlled to correspond to the brake pedal depression by way of a motor drive speed control of the pump, with the pair of the inlet control valves being substantially fully opened, while the pair of the outlet control valves being substantially closed, so that the pressure sensors provided for measuring the pressures of the pair of wheel cylinders are applied with a common pressure through the fluid circuit.

Such a manner of operation of the brake system that the fluid pressures of the pair of wheel cylinders are controlled according to the depression of the brake pedal by the driver by way of the speed control of the motor driving of the pump, with the pair of the inlet control valves being substantially fully opened, while the pair of the outlet control valves being substantially closed, may be only temporarily carried out at such a time when, for example, the brake pedal is depressed while the vehicle is not moving, or may be normally carried out during the driving of the vehicle.

Even in the latter case, the pair of inlet and outlet control valves are still required in order to incorporate a manual brake part in the brake system for an emergency purpose.

Further, when the fluid pressures supplied to the pair of wheel cylinders are controlled by the speed control of the motor driving of the pump, the brake control means may control one of the pair of outlet control valves such that the substantially closed condition thereof is modified so as to make an adjustment of the fluid pressures supplied to the pair of wheel cylinders.

By such a comparison between the outputs of the pair of pressure sensors, it is judged at least if both of the pair of sensors are operating normally, and therefore, if at least one of the pair of sensors is not operating normally. In the art herein concerned, it is practically essential and enough if the failure of any one of a plurality of sensors is judged, because it is very rare that two or more sensors fail at the same time, while when any one of the sensors has failed, the vehicle will be brought to a repair shop where it will be readily known which of the plurality of sensors has failed, while other sensors will also receive inspections for maintenance.

Further, the above-mentioned further particular object of the present invention is accomplished according to the present invention when the brake system of the above-mentioned construction further comprises a pump delivery pressure sensor for measuring a delivery fluid pressure of the pump, and the brake control means further comprise means for comparing an output signal of the pump delivery pressure sensor and the output signal of a first one of the pair of wheel cylinder pressure sensors to judge if there is a second difference therebetween beyond a second predetermined threshold value; and means for judging the pump delivery pressure sensor and the pair of wheel cylinder pressure sensors to be all operating normally when the first difference is not larger than the first threshold value, with the second difference being not larger than the second threshold value.

In the brake system of the above-mentioned construction, the brake control means may further comprise means for judging the pump delivery pressure sensor to be not operating normally when the first difference is not larger than the first threshold value, with the second difference being larger than the second threshold value.

In the brake system of the above-mentioned construction, the brake control means may further comprise means for judging a second one of the pair of wheel cylinder pressure sensors to be not operating normally when the first difference is larger than the first threshold value, with the second difference being not larger than the second threshold value.

In the brake system of the above-mentioned construction, the brake control means may further comprise means for judging the first one of the pair of wheel cylinder pressure sensors to be not operating normally when the first difference is larger than the first threshold value, with the second difference being larger than the second threshold value.

In the brake system of the above-mentioned construction, the brake control means may further comprise means for comparing the output signals of the pump delivery pressure sensor and a second one of the pair of wheel cylinder pressure sensors to judge if there is a third difference therebetween beyond the second predetermined threshold value; and means for judging the first one of the pair of wheel cylinder pressure sensors to be not operating normally when the first difference is larger than the first threshold value, with the second difference being not larger than the second threshold value.

In the brake system of the above-mentioned construction having the means for comparing the output signals of the pump delivery pressure sensor and the second one of the pair of wheel cylinder pressure sensors, the brake control means may further comprise means for judging the second one of the pair of wheel cylinder pressure sensors to be not operating normally when the first difference is larger than the first threshold value, with the second difference being larger than the second threshold value.

In the brake system of the above-mentioned construction, the pair of wheel cylinders may be those for braking the pair of front wheels, and the first and second threshold values may be substantially equal to one another.

In the brake system of the above-mentioned construction, the pair of wheel cylinders may be those for braking the pair of rear wheels, and the second threshold value may be larger than the first threshold value by an amount corresponding to a less braking of the rear wheels relative to the front wheels.

BRIEF DESCRIPTION OF THE DRAWINGS

In the accompanying drawings,

FIG. 1A is a diagram showing an example of a hydraulic circuit of a brake system of a four-wheeled vehicle in which the present invention is embodied essentially as an electronically operating construction;

FIG. 1B is a diagram showing an electric part of the brake system shown in FIG. 1A;

DESCRIPTION OF THE EMBODIMENTS

Figure 2:
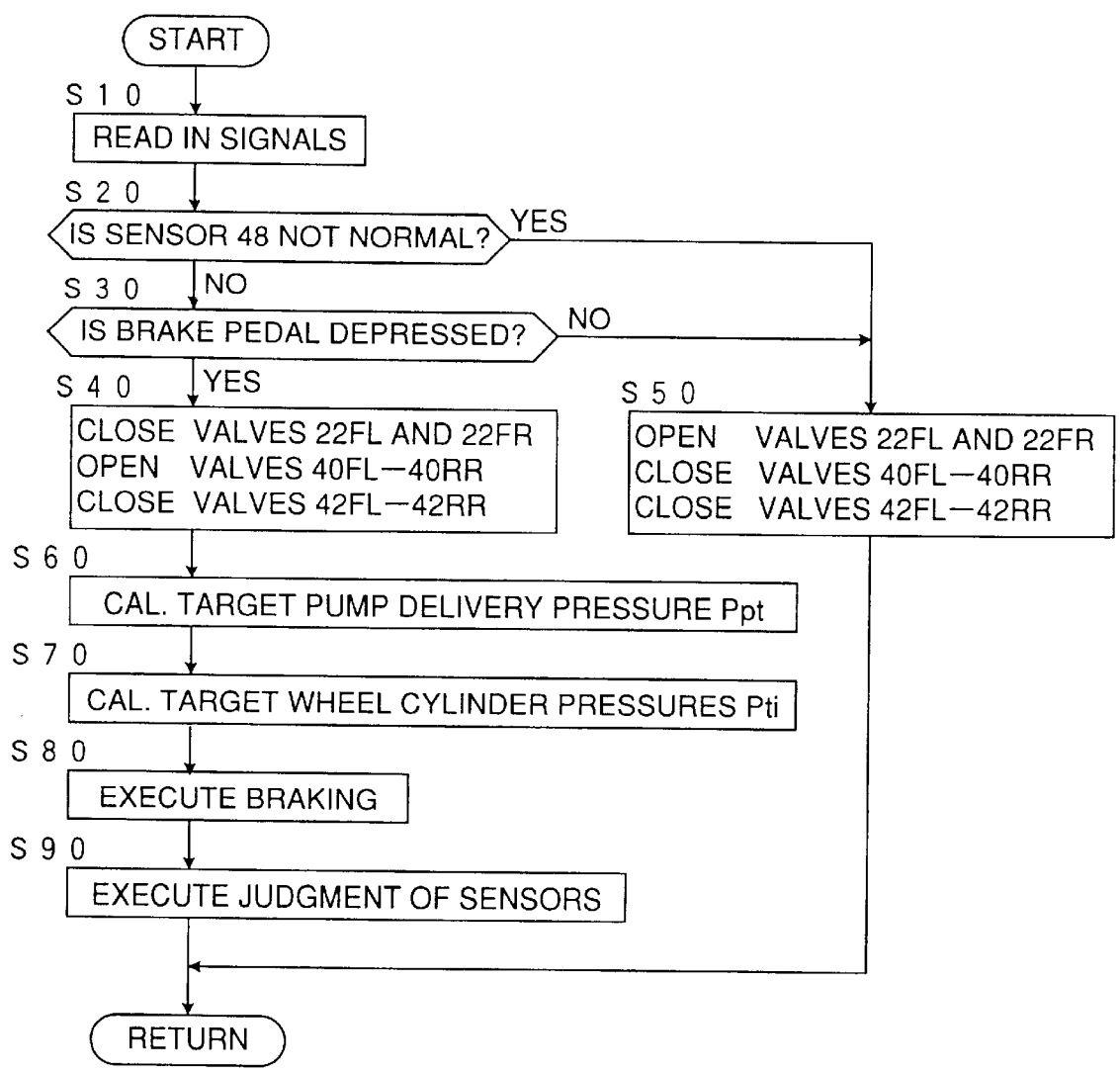
FIG. 2 is a flowchart showing an embodiment of the brake system according to the present invention in the form of its operation essential to the present invention.

In the following, the present invention will be described in more detail in the form of some preferred embodiments with reference to the accompanying drawings.

Referring to FIG. 1A, 10 generally designates the fluid circuit of a brake system of a four-wheeled vehicle (not shown). Although the present invention is incorporated in this fluid circuit, such a fluid circuit itself is already known in the art. The circuit includes a brake pedal 12 adapted to be depressed by a driver. The brake pedal 12 actuates a master cylinder 14 which can supply a pressure of a hydraulic brake fluid to passages 16 and 18 leading to wheels cylinders 20FL and 20FR of front left and front right wheels (not shown), respectively, of the vehicle. The passages 16 and 18 incorporate therein changeover valves 22FL and 22FR, respectively, the operation of which is described later. The fluid circuit also includes wheel cylinders 20RL and 20RR of rear left and rear right wheels (not shown). 24 is a damping chamber for the master cylinder, adapted to temporarily accept a part of the hydraulic brake fluid from the master cylinder when the brake pedal is depressed by the driver with the changeover valves 22FL and 22FR kept closed.

26 is a reservoir for the brake fluid. A passage 28 leads from the reservoir through a pump 34 which is driven by an electric motor 32. A return passage 30 is provided to collect the fluid from the outlet sides of the wheel cylinders and to return the fluid to the reservoir 26.

The outlet port of the pump 34 is connected to the wheel cylinders 20FL, 20FR, 20RL and 20RR in parallel by inlet passages 36FL, 36FR, 36RL and 36RR including inlet control valves 40FL, 40FR, 40RL and 40RR, respectively, which are each constructed as a normally closed changeover valve biased to its closed position such as shown in the figure when no actuating electric current is supplied thereto from electric control means described hereinbelow. The wheel cylinders 20FL, 20FR, 20RL and 20RR are also connected with the return passage 30 in parallel by outlet passages 38FL, 38FR, 38RL and 38RR including outlet control valves 42FI, 42FR, 42RL and 42RR, respectively, in which the control valves 42FL and 42FR are each also a normally closed changeover valve biased to its closed position such as shown in the figure when no actuating electric current is supplied and changed over to its open position when an actuating electric current is supplied thereto from the electric control means, while the control valves 42RL and 42RR are each a normally open changeover valve biased to its open position such as shown in the figure when no actuating electric current is supplied and changed over to its closed position when an actuating electric current is supplied thereto from the electric control means, while the control valves 42RL and 42RR are each a normally open changeover valve biased to its open position such as shown in the figure when no actuating electric current is supplied and changed over to its closed position when an actuating electric current is supplied thereto from the electric control means.

Pressure sensors 44FL, 44FR, 44RL and 44RR are connected to the wheel cylinders 20FL, 20FR, 20RL and 20RR, respectively, for measuring the fluid pressures supplied therein. Another pressure sensor 46 is connected to the passage 18 to measure the pressure of the master cylinder 14. A further pressure sensor 48 is connected to the passage 28 at the output port of the pump 34 to measure the delivery pressure of the pump 34.

FIG. 1B shows the electric control means generally designated by 52 for operating the hydraulic circuit 10 of FIG. 1A. The electric control means 52 include a micro-computer 54 which conducts control calculations based upon signals indicating pressures Pi ("i" representing suffixes fl, fr, rl and rr indicating the pertinency to the front left, front right, rear left and rear right wheels) at the wheel cylinders 20FL, 20FR, 20RL and 20RR received from the pressure sensors 44FL, 44FR, 44RL and 44RR, respectively, a signal indicating pressure Pm at the master cylinder 14 from the pressure sensor 46, a signal indicating pressure Pp from the pressure sensor 48 at the outport port of the pump 30, and signals indicating wheel speeds Vwi from wheel speed sensors 50FL, 50FR, 50RL and 50RR (only shown in FIG. 1B), and outputs control signals to the motor 32 and the changeover valves 22FL and 22FR, 40FL–40RR and 42FL–42RR through a drive circuit 56.

The micro-computer 54 may be of a conventional construction composed of a central processor unit, a read only memory, a random access memory, input and output port means and a bilateral common bus interconnecting these constructional elements, with the conventional basic operation programs and particular programs prepared according to the present invention stored therein. It will be noted that the micro-computer 54 is also used for other controls of the vehicle such as a spin control or a driftout control with corresponding programs stored therein and signals received from other sensors and/or control input means not related with the present invention and therefore not shown in the figure.

The present invention will now be described in the form of its control operation of some embodiments with reference to FIGS. 2–4.

Referring to FIG. 2, the control operation is started by a turning on of an ignition switch (not shown) of the vehicle, and repeated along the steps at a predetermined cycle time, such as tens of milliseconds until the ignition switch is turned off.

In step 10, the signals from the sensors shown in FIG. 1B are read in.

In step 20, it is judged if the sensor 48 is not normal. In the first pass after the start, the judgment is no according to the initialization of the system at the starting of the control, as usual in this art. Therefore, the control proceeds to step 30.

In step 30, it is judged if the brake pedal 12 is depressed by the driver. When the answer is yes, the control proceeds to step 40, whereas when the answer is no, the control proceeds to step 50.

In step 40, the valves 22FL and 22FR are closed, i.e. changed over to a position of shutting off the corresponding passages, opposite to the position shown in FIG. 1A; the valves 40FL–40RR are opened, i.e. changed over to a position of communicating the corresponding passages, opposite to the position shown in FIG. 1A; and the valves 42FL–42RR are closed. Indeed, the normally closed type valves 42FL–42FR are only kept closed. Further, it will be noted that, when the ignition switch is not turned on, or the electric control system has failed for some cause, the manual brake part comprising the master cylinder 14, the passages 16 and 18 and the front left and front right wheel cylinders 20FL and 20FR is established with the normally open changeover valves 22FL and 22FR being opened, as isolated from the electrical brake part by the normally closed changeover valves 40FL–40RR and 42FL–42RR.

When the answer of step 20 is yes in the second or subsequent pass, or when the answer of step 30 is no, the control proceeds to step 50, where the valves 22FL and 22FR are opened, the valves 40FL–40RR are closed, and the valves 42FL–42RR are closed so that the brake is prepared to be ready to be directly manually operated by the brake pedal.

In step 60, a target pump delivery pressure Ppt is calculated based upon the depression of the brake pedal 12 detected by the pressure sensor 46 as the pressure Pm. As will be appreciated, this embodiment is constructed to normally execute the braking with the electric brake part in such a manner that the strength of braking is controlled by the output pressure of the pump 34, i.e. the motor drive control of the pump. The calculation of the target pump pressure corresponding to the magnitude brake pedal depression will be readily available. by an appropriate map being prepared beforehand. Further, such a calculation may incorporate the vehicle speed available from the signals of the wheel speed sensors 50FL–50RR as an adaptation parameter.

In step 70, target wheel cylinder pressures Pti (i=fl, fr, rl, rr) are calculated also based upon the depression of the brake pedal and the vehicle speed. Indeed, although the calculation of the target pump pressure and the calculation of the target wheel cylinder pressures are shown to be executed stepwise in the flowchart for the purpose of illustration, they may be conducted at the same time with an interrelation with one another.

In step 80, the braking is executed so as to supply the calculated target fluid pressure to each of the wheel cylinders with a controlled motor driving of the pump. Of course such a braking may be executed with a feedback of the pressures of the corresponding portions measured by the pressure sensors 44FL–44RR and 48, as long as it is confirmed that those pressure sensors are operating normally. However, when it is detected in the next step 90 that the pressure sensor 48 at the output of the pump 34 is not operating normally, in the next cycle of the flowchart, the control is diverted at step 20 toward step 50, as described above.

Figure 3:
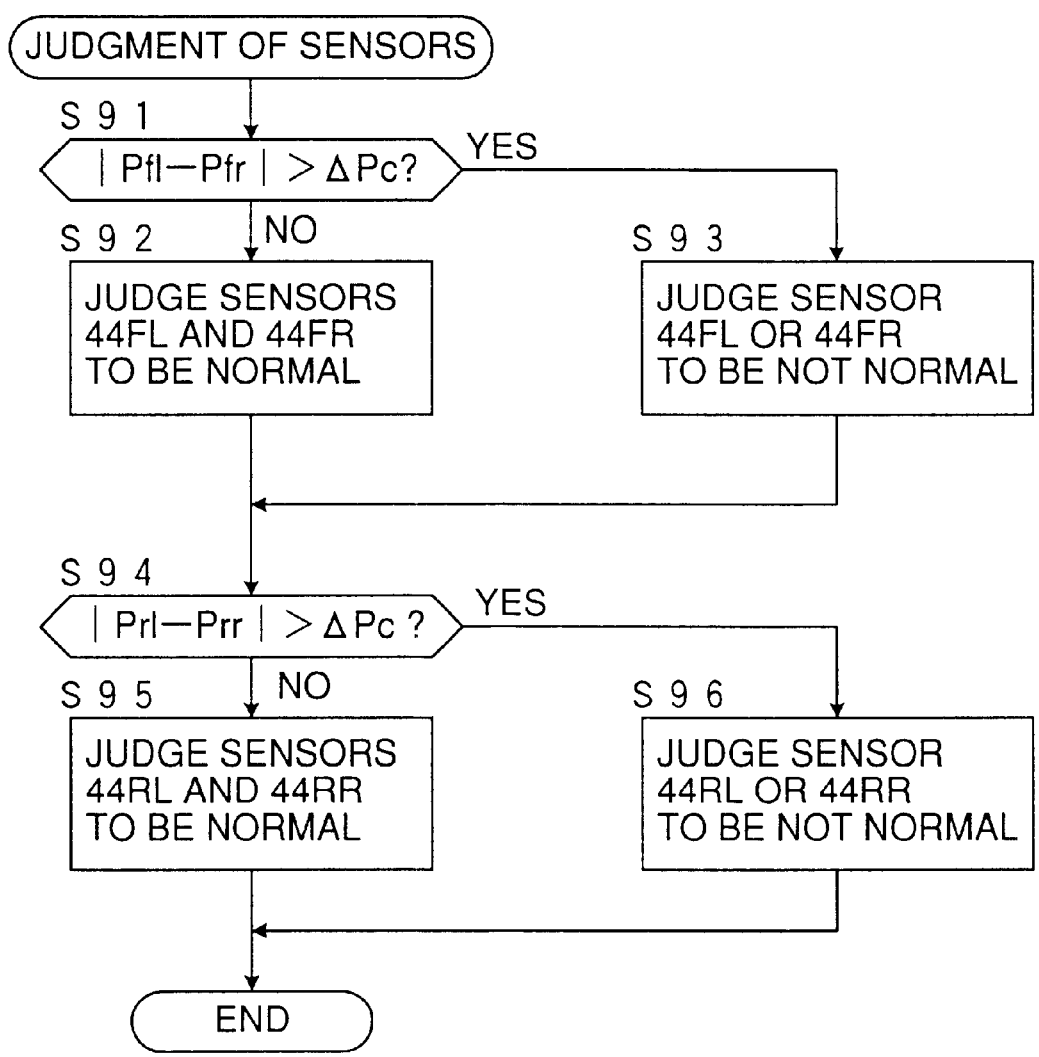
FIG. 3 is a subroutine flowchart of a first embodiment of the operation executed in step 90 of FIG. 2.
Figure 4:
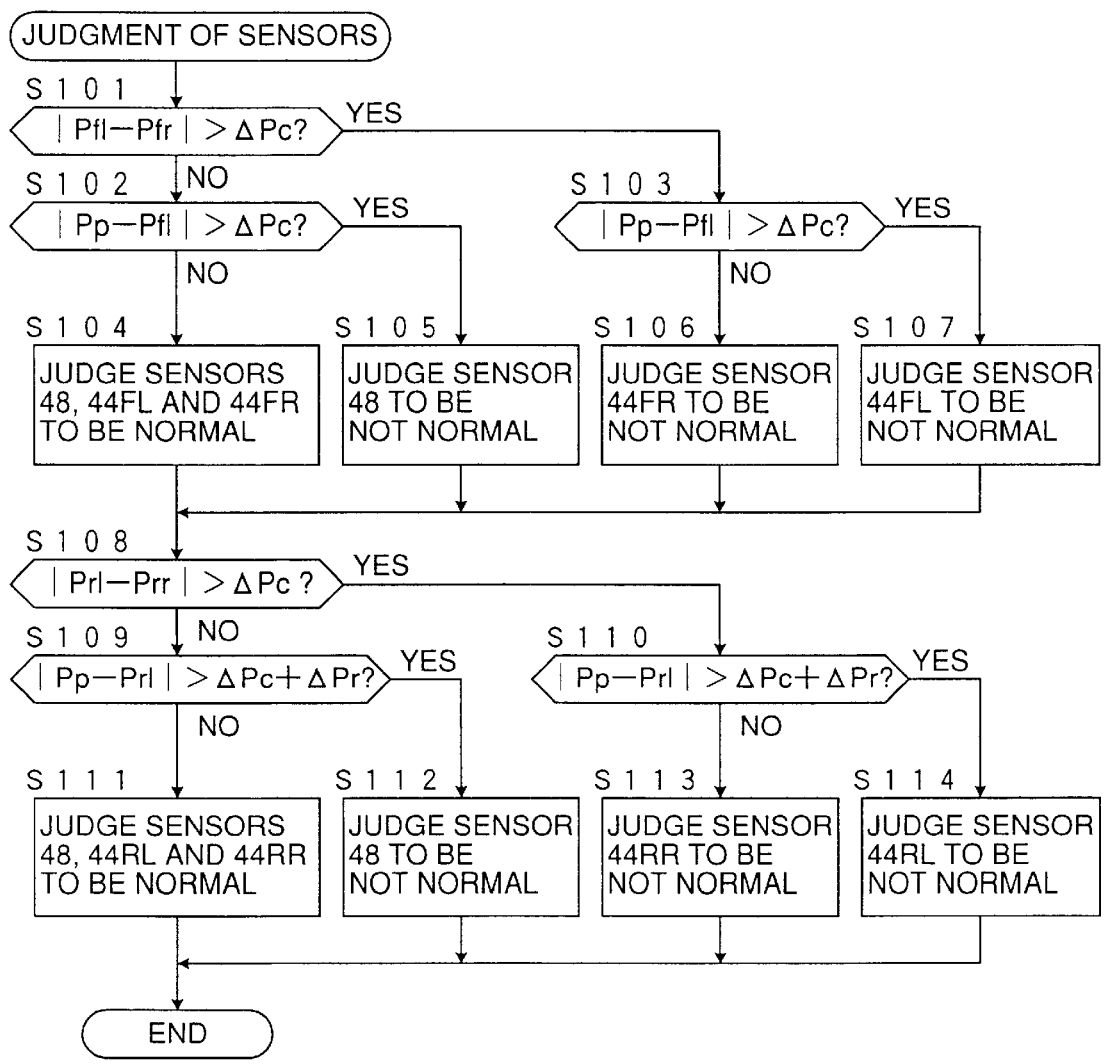
FIG. 4 is a subroutine flowchart of a second embodiment of the operation executed in step 90 of FIG. 2.
Figure 5:
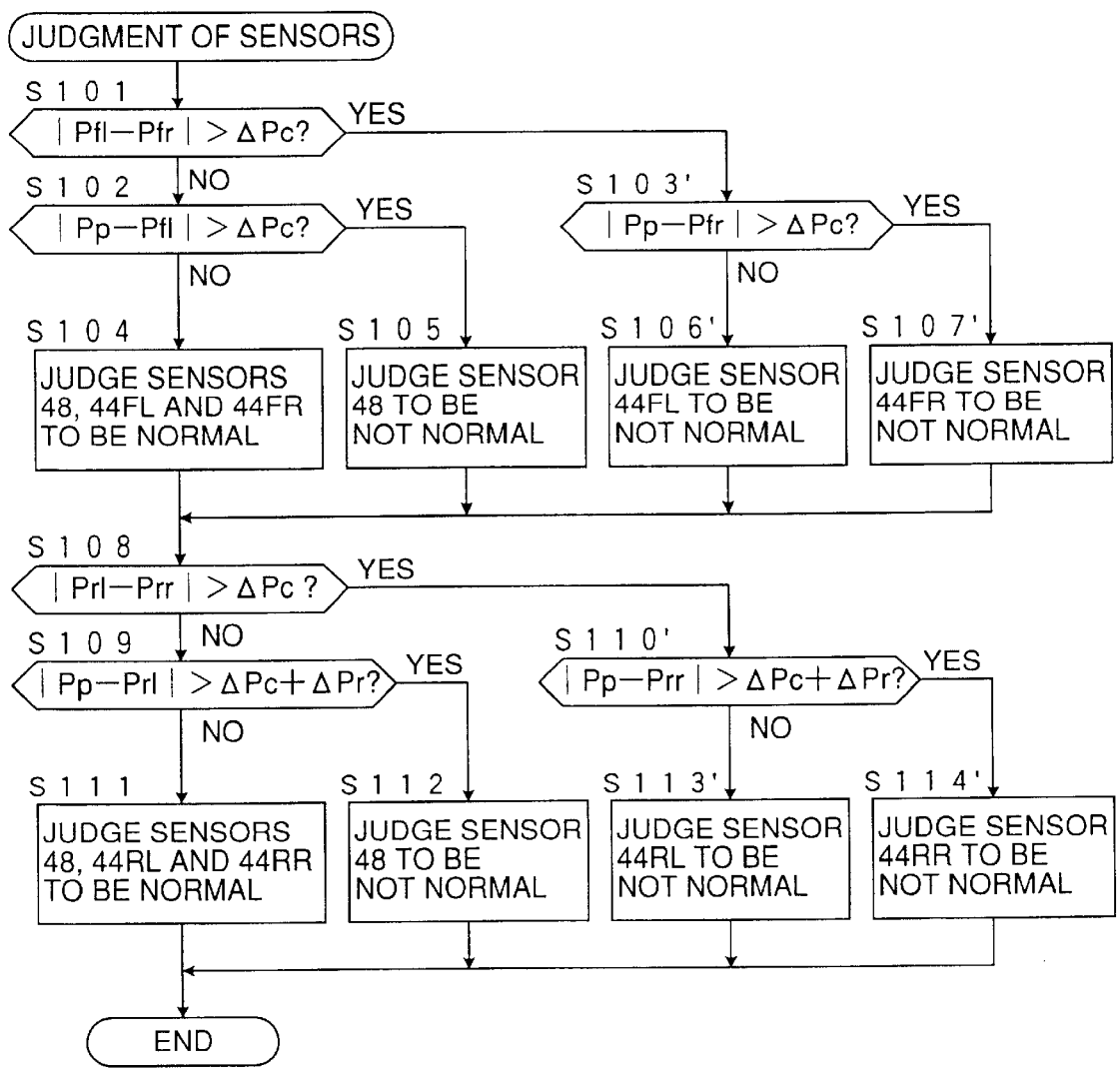
FIG. 5 is a flowchart similar to that of FIG. 4, showing a third embodiment of the operation executed in step 90 of FIG. 2.

In step 90, judgment of the sensors is executed in a manner as shown by the flowchart of FIG. 3, 4 or 5.

Referring to FIG. 3 showing the operations executed in step 90, in step 91, it is judged if the absolute value of the difference between Pfl and Pfr, i.e. the output of the pressure sensor 44FL and the output of the pressure sensor 44FR, is larger than a predetermined threshold value ΔPc which is an allowance for normal fluctuations of the outputs of such pressure sensors. When the answer is no, the control proceeds to step 92, whereas when the answer is yes, the control proceeds to step 93.

In step 92, it is judged that the pressure sensors 44FL and 44FR are both operating normally. Herein, it is reasonably assumed that in the condition of the changeover valves 40FL and 40FR being substantially fully opened with the changeover valves 42FL and 42FR being substantially opened, the pressures of the wheel cylinders 20FL and 20FR are substantially equal to one another.

On the other hand, when the control has proceeded to step 93, it is judged that either one of the pressure sensors 44FL and 44FR is not operating normally. It is not important to know which of these two pressure sensors is not operating normally, because it is readily known in a repair shop. Although not shown in the figure, a warning lamp indicating the matter may be put on in step 93.

The above steps 91–93 are provided for judging the normal operation of the pair of pressure sensors for the front wheel cylinders. In the shown embodiment, the normal operation of the pair of pressure sensors for the rear wheel cylinders is carried out in a similar manner.

In step 94, it is judged if the absolute value of the difference between Prl and Prr, i.e. the output of the pressure sensor 44RL and the output of the pressure sensor 44RR, is larger than a predetermined threshold value ΔPc. When the answer is no, the control proceeds to step 95, whereas when the answer is yes, the control proceeds to step 96.

In step 95, it is judged that the pressure sensors 44RL and 44RR are both operating normally. On the other hand, when the control has proceeded to step 96, it is judged that either one of the pressure sensors 44RL and 44RR is not operating normally. Again it is not important which of these two pressure sensors is not operating normally.

FIG. 4 shows another embodiment of the operations executed in step 90. In step 101, it is judged if the absolute value of the difference between Pfl and Pfr is larger than the predetermined threshold value ΔPc, in the same manner as in step 91 of FIG. 3. When the answer is no, the control proceeds to step 102, whereas when the answer is yes, the control proceeds to step 103.

In step 102, it is judged if the absolute value of the difference between Pp and Pfl, i.e. the output of the pressure sensor 48 and the output of the pressure sensor 44FL, is larger than the threshold value ΔPc. Herein it is reasonably assumed that in the condition of the changeover valves 40FL and 40FR being substantially fully opened with the changeover valves 42FL and 42FR being substantially opened, the pressures of the wheel cylinders 20FL and 20FR are substantially equal to one another and also to the pressure at the outlet of the pump 34. When the answer is no, the control proceeds to step 104, whereas when the answer is yes, the control proceeds to step 105.

In step 104, it is judged that the pressure sensors 48, 44FL and 44FR are all operating normally. On the other hand, when the control has proceeded to step 105, it is judged that the pressure sensor 48 is not operating normally. As described above with reference to step 20 of FIG. 2, when it was judged that the pressure sensor 48 is not operating normally, the control proceeds to step 50, and the brake system is constantly changed over to the manual operation dependent upon the master cylinder. Further, although not shown in the figure, a warning lamp indicating the matter may be put on in step 105.

In step 103, it is judged if the absolute value of the difference between Pp and Pfl is larger than ΔPc. What is done here is the same as that done in step 102. When the answer is no, the control proceeds to step 106, whereas when the answer is yes, the control proceeds to step 107.

In step 106, it is judged that the pressure sensor 44FR is not operating normally. On the other hand, in step 107, it is judged that the pressure sensor 44FL is not operating normally. The both cases may also be indicated by warning lamps, respectively, though not shown in the figure.

The above steps 101–107 are provided for judging the normal operation of the pair of pressure sensors for the front wheel cylinders and the outlet of the pump. In the shown embodiment, the normal operation of the pair of pressure sensors for the rear wheel cylinders is carried out in a similar manner.

In step 108, it is judged if the absolute value of the difference between Prl and Prr is larger than ΔPc. When the answer is no, the control proceeds to step 109, whereas when the answer is yes, the control proceeds to step 110.

In step 109, it is judged if the absolute value of the difference between Pp and Prl is larger than a threshold value ΔPc+ΔPr. Herein it is assumed that the brake system is so constructed as to apply a less braking force to the pair of rear wheels than to the pair of front wheels for improving the stability of the vehicle against a spinning due to a braking. As well known in the art, when a wheel is braked, the capacity of the lateral tire grip is correspondingly decreased, indeed more in the rear wheels than in the front wheels, because the weight distribution on the four wheels shifts toward the front side. The additional allowance by ΔPr corresponds to a reduction of the fluid pressure of the rear wheel cylinders relative to the pressure at the outlet of the pump. If there is applied no such less braking to the rear wheels than the front wheels, ΔPr may be zero. When the answer is no, the control proceeds to step 111, whereas when the control is yes, the control proceeds to step 112.

In step 111, it is judged that the pressure sensors 48, 44RL and 44RR are all operating normally. On the other hand, when the control has proceeded to step 112, it is judged that the pressure sensor 48 is not operating normally, though this may have already been detected in step 105, except when the pressure sensor 48 goes wrong at an instant when the control transfers from the judgment of the front part pressure sensors to those of the rear part.

In step 110, it is judged if the absolute value of the difference between Pp and Prl is larger than ΔPc+ΔPr. What is done here is the same as that done in step 109. When the answer is no, the control proceeds to step 113, whereas when the answer is yes, the control proceeds to step 114.

In step 113, it is judged that the pressure sensor 44RR is not operating normally. On the other hand, in step 114, it is judged that the pressure sensor 44RL is not operating normally. The both cases may also be indicated by warning lamps, respectively, though not shown in the figure.

FIG. 5 shows a small modification of the flowchart of FIG. 4. In this modification, in step 103', it is judged if the absolute value of the difference between Pp and Pfr is larger than ΔPc, different from the comparison between Pp and Pfl in step 102. Accordingly, in step 106' it is judged that the pressure sensor 44FL is not operating normally, while in step 107' it is judged that the pressure sensor 44FR is not operating normally.

Similarly, in the flowchart of FIG. 5, in step 110' it is judged if the absolute value of the difference between Pp and Prr is larger than ΔPc+ΔPr, different from the comparison between Pp and Prl in step 109. Accordingly, in step 113' it is judged that the pressure sensor 44RL is not operating normally, while in step 114' it is judged that the pressure sensor 44RR is not operating normally.

In all of these embodiments, it will be appreciated that the pressure sensors for the pair of front wheel cylinders or the pair of rear wheel cylinders or both are judged with regard to if they are operating normally, with no need of adding a pipe and a valve to the conventional fluid circuit of the electric brake system.

Although the present invention has been described in detail with respect to some preferred embodiments thereof, it will be apparent for those skilled in the art that various modifications are possible with respect to the shown embodiments within the scope of the present invention.

What is claimed is:

1. A brake system of a vehicle having a first pan of front wheels and a pair of rear wheels, comprising a brake pedal, a fluid reservoir, a motor-driven pump for pumping a fluid from the reservoir to an outlet port thereof, at least one pair of wheel cylinders for braking one of the front pair and the rear pair of wheels according to a supply of a fluid pressure thereto, a fluid circuit having a pair of inlet control valves for selectively connecting the pair of wheel cylinders respectively to the outlet port of the pump and a pair of outlet control valves for selectively connecting the pair of wheel cylinders respectively to the reservoir, brake control means for controlling a motor driving of the pump and opening/closing of the inlet and outlet control valves so as to supply a controlled fluid pressure to the pair of wheel cylinders, and pressure sensors including a pair of wheel cylinder pressure sensors for measuring fluid pressures of the pair of wheel cylinders, the brake control means comprising:

means for repeatedly at least temporarily substantially fully opening the pair of inlet control valves while substantially closing the pair of outlet control valves for supplying the controlled fluid pressure to the pair of wheel cylinders during an operation of the vehicle;

means for comparing output signals of the pair of wheel cylinder pressure sensors when the controlled fluid pressure is supplied thereto to judge if there is a first difference therebetween beyond a first predetermined threshold allowance value; and means for judging the pair of wheel cylinder pressure sensors to be all operating normally when the first difference is not larger than the first threshold allowance value.

2. A brake system according to claim 1, wherein the brake control means further comprise means for judging one of the pair of wheel cylinder pressure sensors to be not operating normally when the first difference is larger than the first threshold allowance value.

3. A brake system according to claim 1, wherein the brake control means control the motor driving of the pump such that, when the pair of inlet control valves are substantially fully opened with the pair of outlet control valves being substantially closed, the fluid pressures of the pair of wheel cylinders are controlled to correspond to a depression of the brake pedal substantially by a speed control of the motor driving of the pump.

4. A brake system according to claim 3, wherein the brake control means control one of the pair of outlet control valves such that the substantially closed condition thereof is modified so as to make an adjustment of the fluid pressures of the pair of wheel cylinders.

5. A brake system according to claim 1, further comprising a pump delivery pressure sensor for measuring a delivery fluid pressure of the pump, wherein the brake control means further comprise means for comparing an output signal of the pump delivery pressure sensor and the output signal of a first one of the pair of wheel cylinder pressure sensors to judge if there is a second difference therebetween beyond a second predetermined threshold allowance value; and means for judging the pump delivery pressure sensor and the pair of wheel cylinder pressure sensors to be all operating normally when the first difference is not larger than the first threshold allowance value, with the second difference being not larger than the second threshold allowance value.

6. A brake system according to claim 1, wherein the brake control means further comprise means for judging the pump delivery pressure sensor to be not operating normally when the first difference is not larger than the first threshold allowance value, with the second difference being larger than the second threshold allowance value.

7. A brake system according to claim 5, wherein the brake control means further comprise means for judging a second one of the pair of wheel cylinder pressure sensors to be not operating normally when the first difference is larger than the first threshold allowance value, with the second difference being not larger than the second threshold allowance value.

8. A brake system according to claim 5, wherein the brake control means further comprise means for judging the first one of the pair of wheel cylinder pressure sensors to be not operating normally when the first difference is larger than the first threshold allowance value, with the second difference being larger than the second threshold allowance value.

9. A brake system according to claim 5, wherein the brake control means further comprise means for comparing the output signals of the pump delivery pressure sensor and a second one of the pair of wheel cylinder pressure sensors to judge if there is a third difference therebetween beyond the second predetermined threshold allowance value; and means for judging the first one of the pair of wheel cylinder pressure sensors to be not operating normally when the first difference is larger than the first threshold allowance value, with the second difference being not larger than the second threshold allowance value.

10. A brake system according to claim 9, wherein the brake control means further comprise means for judging the second one of the pair of wheel cylinder pressure sensors to be not operating normally when the first difference is larger than the first threshold allowance value, with the second difference being larger than the second threshold allowance value.

11. A brake system according to claim 1, wherein the pair of wheel cylinders are those for braking the pair of front wheels, and the first and second threshold allowance values are substantially equal to one another.

12. A brake system according to claim 5, wherein the pair of wheel cylinders are those for braking the pair of rear wheels, and the second threshold allowance value is larger than the first threshold allowance value by an amount corresponding to a less braking of the rear wheels relative to the front wheels.

* * * * *